United States Patent Office 3,190,399
Patented June 22, 1965

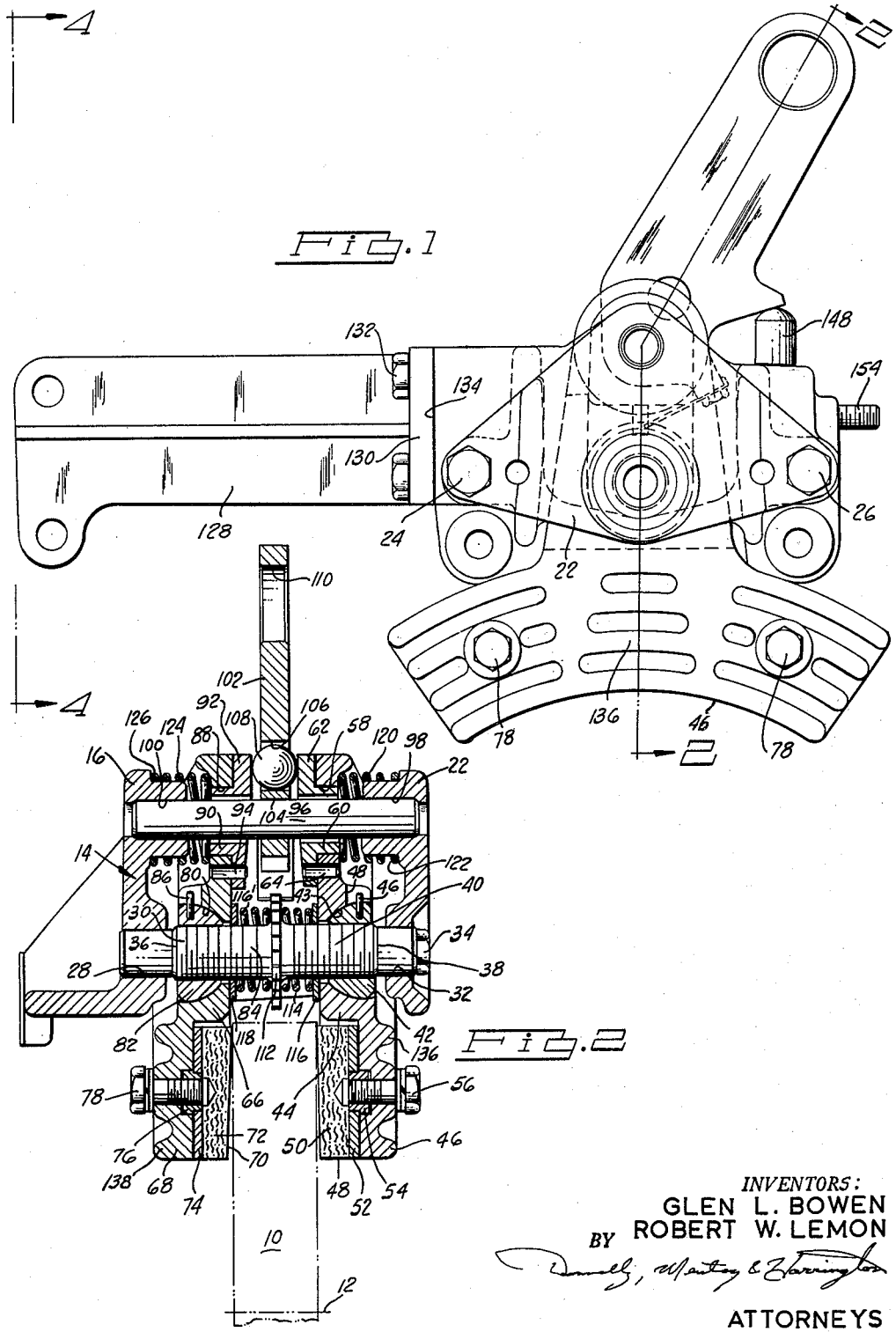

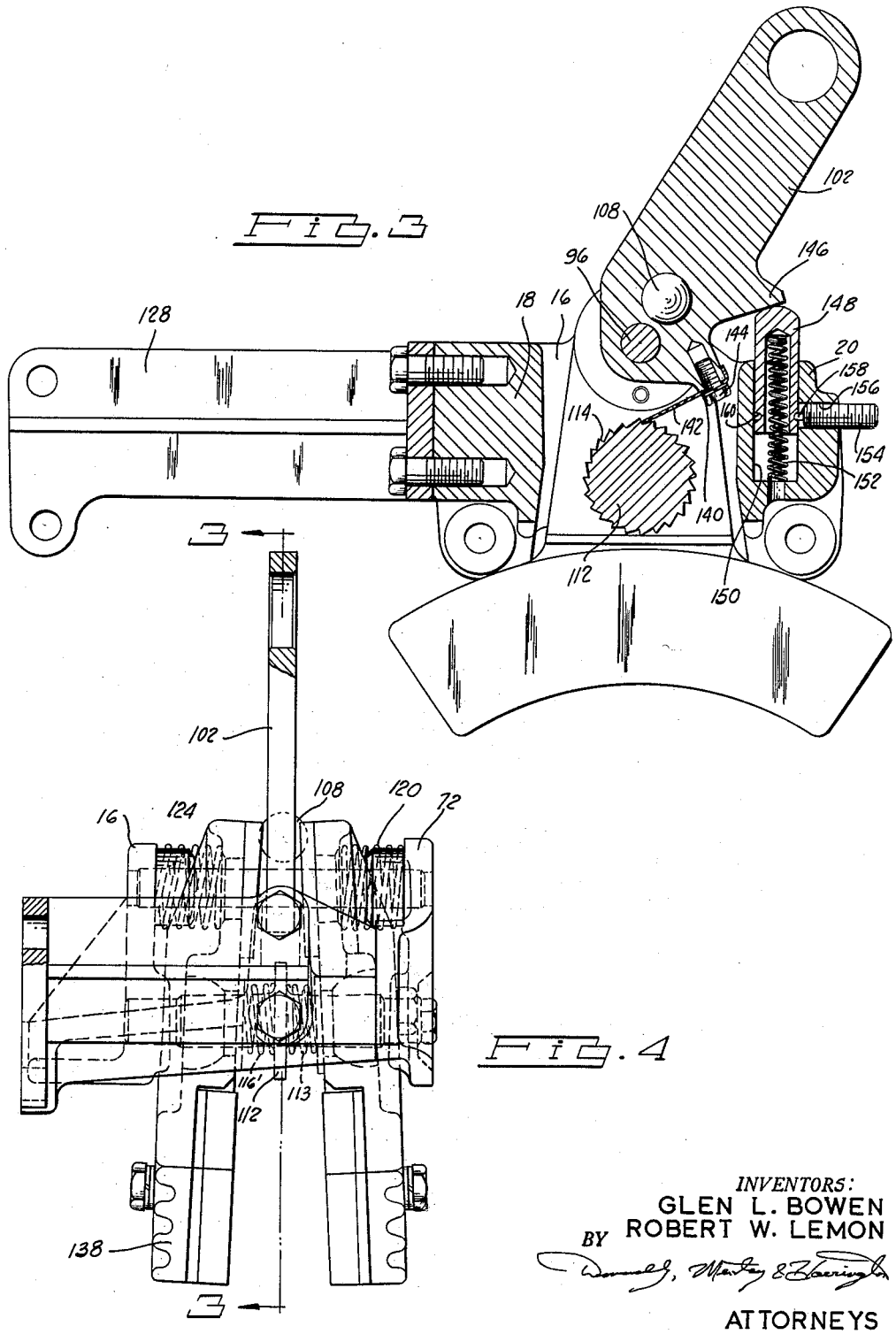

3,190,399
LEVER ACTUATED, SPOT TYPE DISC BRAKE WITH AUTOMATIC ADJUSTING MEANS
Glen L. Bowen, Detroit, and Robert W. Lemon, Farmington, Mich., assignors to G. L. Bowen & Co., Oak Park, Mich., a corporation of Michigan
Filed Sept. 3, 1963, Ser. No. 306,229
6 Claims. (Cl. 188—73)

Our invention relates generally to disc brake mechanisms, and more particularly, to a manually controlled disc brake operator that is characterized by a high degree of mechanical advantage and by a semi-automatic slack-takeup mechanism that compensates for wear of the friction elements of the brake.

According to a principal feature of our invention, we have provided a disc brake structure having spot brake friction elements situated on either side of the peripheral portion of the brake disc. The friction elements are carried by floating brake operators that in turn are supported on a threaded support carried by a fixed brake housing. Each operator can be oscillated about its support in a direction transverse to the plane of the disc. An improved ball and cam arrangement is provided for accomplishing this oscillatory motion.

The use of an arrangement of this type makes possible a high degree of mechanical advantage and eliminates the necessity for using complex leverage systems for engaging and releasing the friction elements.

The provision of a mechanism of the type above set forth being a principal object of our invention, it is a further object of our invention to provide a manually controlled disc brake mechanism having a manual brake operating lever for applying and releasing friction elements of the brake structure, wherein provision is made for adjusting the slack of the brake operators by actuating the lever beyond the normal degree of travel.

It is a further object of our invention to provide a manually operated disc brake mechanism of the type above set forth and which is characterized by its simplicity in design and its reduced space requirements.

Further objects and features of our invention will become apparent from the following description and from the accompanying drawings, wherein:

FIGURE 1 shows a front elevation view of our improved brake structure,

FIGURE 2 is a transverse cross-sectional view of the structure of FIGURE 1 taken along the plane of section lines 2—2 of FIGURE 1, FIGURE 3 is a cross-sectional view taken along the plane of section line 3—3 of FIGURE 4, and FIGURE 4 shows the structure of FIGURE 1 as viewed from the plane of the section line 4—4 of FIGURE 1.

Referring first to FIGURE 2, numeral 10 designates a brake disc which is adapted to rotate about an axis 12. A suitable driven member, not shown, can be connected to the disc 10. A stationary housing structure indicated at 14 is formed with a generally U-shape and has a first base portion 16 and two side portions 18 and 20, as best indicated in FIGURE 3.

As best indicated in FIGURES 1 and 4, the open side of the housing 14 has secured thereto a support plate 22 which is secured in place by means of bolts 24 and 26.

The base portion 16 of the housing 14 is formed with a circular opening 28 which receives one end of a threaded support shaft 30. The other end of the shaft 30 is received within an opening 32 formed in the plate 22. The end of shaft 30 adjacent plate 22 can be formed with a hexagonal head 34 to permit rotary adjustment of the shaft 30 by means of a hand tool, such as a socket wrench. The ends of shaft 30 are formed with slightly reduced diameters to define shoulders 36 and 38 which prevent axial movement of shaft 30 with respect to the housing 14 after it is assembled.

Shaft 30 is formed with a threaded portion 40 upon which is received a semi-spherical crowned nut 42. The crowned portion of the nut 42 is received within the concave recess 43 formed in a brake operator element 44. A locating pin 46 is received within a slot 48 formed in the element 44 to prevent rotary motion of the element 44 about the axis of the shaft 30 with respect to nut 42.

Element 44 extends downwardly as indicated in the drawings toward the axis 12. The end 46 of the element 44 has secured thereto a spot brake friction element 48. This element includes a sintered metal friction portion 50 and a steel back-up portion 52. A threaded adapter 54 is connected to portion 52 and is internally threaded to receive a bolt 56 that extends through the end 46 of the element 44.

The upper or radially outward end of element 44 is apertured at 58 to receive a sleeve extension 60 of a cam plate 62. Relative rotation between plate 62 and the element 44 is prevented by a locking pin 64.

Another brake operator element 66 is situated on the opposite side of the disc 10. Like element 44, the element 66 carries at its inner or lower end 68 a spot brake shoe 70 having a friction portion 72 and a steel back-up portion 74. The portion 74 is apertured to receive an internally threaded adapter 76 which in turn receives a bolt 78 that extends through a bolt opening formed in the end 68 of the element 66.

An intermediate portion of the element 66 is formed with a crowned recess 80 which receives a crowned nut 82. This nut is threaded upon a threaded portion 84 of the shaft 30. A pin 86 prevents relative rotary movement between the element 66 with respect to the nut 82.

The outer or upper end of the element 66 is apertured at 88 to receive a sleeve extension 90 of a cam plate 92. Relative movement of the cam plate 92 with respect to the element 66 is prevented by a pin 94.

A pivot shaft 96 is end supported by the housing 14. Plate 22 is formed with an opening 98 to receive one end of the shaft 96 and the base portion 16 of the housing 14 is formed with an opening 100 for receiving the other end thereof. The outboard ends of the openings 98 and 100 can be formed with a slightly reduced diameter to form shoulders which inhibit shifting movement of the shaft 96.

Supported upon the intermediate portion of shaft 96 is a brake operating lever 102. This lever is formed with an opening 104 through which the shaft 96 is received. It is formed also with an opening 106 within which is positioned a cam operating ball 108. The diameter of the ball 108 is slightly larger than the thickness of the lever 102 so that it engages the cam plates 62 and 92. A suitable driver-operated linkage can be connected to the end of lever 102 for actuating it, a suitable opening 110 being provided at the outer end of the lever 102 to accommodate a pivoted connection with a suitable brake operating linkage.

When the lever 102 is rotated about the axis of shaft 96 in a counter-clockwise direction as viewed in FIGURE 1, cam plates 62 and 92 are forced away from each other thereby causing elements 44 and 66 to pivot about their respective crowned supporting nuts 42 and 82. This causes the friction brake shoes 48 and 70 to engage the surfaces of disc 10 thereby establishing a braking action. Upon movement of the lever 102 in the opposite direction, the braking action is relaxed and the elements 44 and 66 move away from the braking position. The intermediate portion of shaft 30 is formed with a ratchet wheel 112. Ratchet teeth 114 are formed on the periphery of the wheel 112 as indicated best in FIGURE 3. A spring 113 is situated between the wheel 112 and a back-up washer 116 that engages the inner surface of the element 44. It normally maintains contact between the surface 43 and the crowned surface of the nut 42. A similar spring 116' is situated between the wheel 112 and a back-up washer 118 which engages the inner surface of the element 66. This maintains a constant load upon the element 66 which assures continuous contact between the surface 80 and the crowned surface of the nut 82.

As the lever 102 is moved to the relaxed position, a spring 120 urges the element 44 in a counter-clockwise direction as viewed in FIGURE 2. This spring is situated between the shoulder 122 formed on the plate 22 and the upper or outer end of the element 44. A similar spring 124 is situated between a shoulder 126 formed on the housing portion 16 and the upper or outer end of the element 66.

As best seen in FIGURES 1 and 4, a supporting bracket 128 maintains the housing 14 in a fixed position. It is formed with a flange 130 that can be bolted by means of bolts 132 to the outer surface 134 of the portion 18 for the housing 14. The bracket 128 in turn can be connected to a stationary portion of the vehicle frame.

As best indicated in FIGURES 1 and 2, the end 46, which supports a spot brake friction element 50, is formed with ribs 136 which provide added strength to the element 46 and also increase the cooling capacity of the brake. The end 68, to which the friction element 72 is connected, similarly is formed with ribs 138 as indicated best in FIGURE 4.

The innermost end of lever 102 is formed with a boss 140 to which is secured a ratchet lever in the form of a spring 142. Spring 142 is bolted to the boss 140 by a bolt 144. The extended end of spring 142 is adapted to engage teeth 114 of the ratchet wheel 112.

Lever 102 also is formed with an arm 146 which engages a detent plunger 148 slidably received within a detent plunger opening 150 formed in the housing portion 20. Plunger 148 normally is urged in an outward direction by a plunger spring 152. A threaded detent element 154 is received within a threaded opening 156 formed in the portion 20. It includes a plunger 158 which engages an annular groove 160 formed in the plunger 148, thereby limiting outward movement of the plunger 148.

As the lever 102 is rotated to an extreme position in a clockwise direction, as viewed in FIGURE 3, plunger 148 is depressed and a detent element 158 is shifted out of the groove 160. Spring 152 adds a resistance to continued movement of the lever 102, thereby providing the operator with a so-called "detent feel."

During normal operation of the brake mechanism, the lever 102 is shifted in a counter-clockwise direction as viewed in FIGURE 3. When the brakes are applied, the end of spring 142 then will ride along the surface of one of the teeth 114 for the ratchet wheel 112. If sufficient wear develops in the friction elements 50 and 72, the stroke of lever 102 will increase accordingly. As the friction elements 50 and 72 begin to wear, the stroke of the lever 102 will be increased. To compensate for this wear, it merely is necessary to back-off the lever 102 in a clockwise direction, as viewed in FIGURE 3, until the arm 146 engages the plunger 148. Continued movement of the lever 102 in this direction against the opposing force of spring 152 then will cause the end of spring 142 to move the wheel 112 about its axis. This, of course, will cause an adjustment of the nuts 42 and 82 upon the shaft 30. The threaded portions 84 and 40 on the shaft 30 are formed with right-hand threads and left-hand threads, respectively, so that rotary motion of the shaft 30 in one direction will cause the elements 44 and 66 to move closer together. During subsequent movement of the lever 102 to the brake operating position, the travel will have been decreased and compensation for the wear of the friction elements 50 and 72 then is accomplished.

When the lever 102 returns to its normal operating position following its back-up motion against the plunger 148, the spring 142 then will engage the adjacent tooth 114 on the wheel 112. The brake can be operated then in the usual fashion until sufficient wear again develops to make a subsequent adjustment necessary.

Having thus described a preferred form of our invention, what we claim and desire to secure by U.S. Letters Patent is:

1. A disc brake mechanism comprising a housing, a rotary brake disc mounted externally of said housing, a pair of brake shoes situated one on each side of said brake disc, each brake shoe being supported by a brake operator in the form of a lever, an intermediate portion of each lever being mounted upon said housing, a radially outward portion of each lever carrying a cam member, a brake operating lever pivotally mounted upon said housing, a cam element carried by said brake operating lever intermediate said cam members whereby said brake shoes are urged into frictional engagement with said brake disc upon movement of said brake operating lever in one direction about its pivotal axis, a ratchet wheel, a threaded shaft supporting said ratchet wheel, a universal connection between said threaded shaft and one of said brake operators, a pawl connected to the radially inward end of said brake operating lever and having its free end engaging said ratchet wheel, said pawl being adapted to rotate said wheel upon movement of said brake operating lever to an extreme position in a direction opposite to the direction of movement of said brake operating lever upon application of said brake.

2. A brake disc assembly comprising a housing, a rotary brake disc mounted externally of said housing, spot brake elements situated on both sides of said brake disc, a first pivot shaft mounted within said housing, a separate brake operator supporting each brake element, a pivotal connection between each brake operator and said first pivot shaft, a cam member carried by the radially outward portion of each brake operator, a second pivot shaft, a brake operating lever supported by said second pivot shaft, a cam element carried by said lever intermediate the cam members for said brake operators whereby balanced brake operating forces are applied to said brake disc upon rotary movement of said lever in one direction, a ratchet wheel that is supported by said first pivot shaft, a threaded connection between said first pivot shaft and one of said operators, a pawl connected to the radially inward end of said lever and having its free end engaging said ratchet wheel, said pawl being adapted to rotate said wheel upon movement of said lever to an extreme position in a direction opposite to the direction of movement of said lever upon application of said brake.

3. A brake disc assembly, comprising a rotary brake disc, a relatively stationary housing, spot brake elements situated on both sides of said brake disc, a first pivot shaft carried by said housing, a separate brake operator supporting each brake element, a pivotal connection between each brake operator and said first pivot shaft, a cam member carried by the radially outward portion of each brake operator, a second pivot shaft, a brake operating lever supported by said second pivot shaft, a cam element carried by said lever intermediate the cam members for said brake operators whereby balanced brake operating forces are applied to said brake disc upon rotary movement of said lever in one direction, the pivotal connection between each brake operator and said first pivot shaft including a crowned nut threadably received over a separate threaded portion of said first pivot shaft, a ratchet wheel connected to said first pivot shaft and a pawl connected at one end to the radially inward end of said lever, with its free end engaging the periphery of said ratchet wheel and adapted to rotate said wheel upon movement of said lever to an extreme position in a direction opposite to said one direction.

4. A brake disc assembly, comprising a rotary brake disc, a relatively stationary housing, spot brake elements situated on both sides of said brake disc, a first pivot shaft carried by said housing, a separate brake operator supporting each brake element, a pivotal connection between each brake operator and said pivot shaft, a cam member carried by the radially outward portion of each brake operator, a second pivot shaft, a brake operating lever supported by said second pivot shaft, a cam element carried by said lever intermediate the cam members for said brake operators whereby balanced brake operating forces are applied to said brake disc upon rotary movement of said lever in one direction, the pivotal connection between each brake operator and said first pivot shaft including a crowned nut threadably received over a separate threaded portion of said first pivot shaft, a ratchet wheel connected to said first pivot shaft, a pawl connected at one end to the radially inward end of said lever and having its free end engaging the periphery of said ratchet wheel, said pawl being adapted to rotate said wheel upon movement of said lever to an extreme position in a direction opposite to said one direction, and a detent plunger engageable with said lever upon movement of the latter to said extreme position thereby providing a detent feel during adjustment of said ratchet wheel.

5. A brake disc assembly comprising a housing, a rotary brake disc mounted externally of said housing, spot brake elements situated on both sides of said brake disc, a first pivot shaft carried by said housing, a separate brake operator supporting each brake element, a pivotal connection between each brake operator and said pivot shaft, a cam member carried by the radially outward portion of each brake operator, a second pivot shaft, a brake operating lever supported by said pivot shaft, a spherical cam element carried by said lever intermediate the cam members for said brake operators whereby balanced brake operating forces are applied to said brake disc upon rotary movement of said lever in one direction, the pivotal connection between each brake operator and said first pivot shaft including a crowned nut threadably received over a separate threaded portion of said first pivot shaft, a ratchet wheel connected to said first pivot shaft and a pawl connected at one end to the radially inward end of said lever and having its free end engaging the periphery of said ratchet wheel, said pawl being adapted to rotate said wheel upon movement of said lever to an extreme position in a direction opposite to said one direction, the threaded portion for one nut having a right hand thread and threaded portion for the other nut having a left hand thread whereby said brake operators are moved toward each other upon movement of said ratchet wheel by said pawl to compensate for wear of said brake elements.

6. A brake disc assembly comprising a rotary brake, a relatively stationary housing, spot brake elements situated on both sides of said brake disc, a first pivot shaft carried by said housing, a separate brake operator supporting each brake element, a pivotal connection between each brake operator and said first pivot shaft, a cam member carried by the radially outward portion of each brake operator, a second pivot shaft, a brake operating lever supported by said second pivot shaft, a cam element carried by said lever intermediate the cam members for said brake operators whereby balanced brake operating forces are applied to said brake disc upon rotary movement of said lever in one direction, the pivotal connection between each brake operator and said first pivot shaft including a crowned nut threadably received over a separate threaded portion of said first pivot shaft, a ratchet wheel connected to said first pivot shaft and a pawl connected at one end to the radially inward end of said lever, the end of said pawl engaging the periphery of said ratchet wheel and adapted to rotate said wheel upon movement of said lever to an extreme position in a direction opposite to said one direction, and a detent plunger engageable with said lever upon movement of the latter to said extreme position thereby providing a detent feel during adjustment of said ratchet wheel, the threaded portion for one nut having a right hand thread and threaded portion for the other nut having a left hand thread whereby said brake operators are moved toward each other upon movement of said ratchet wheel by said pawl to compensate for wear of said brake elements.

References Cited by the Examiner
UNITED STATES PATENTS

| | | | |
|---|---|---|---|
| 2,006,418 | 7/35 | Turgot | 188—196 |
| 2,115,083 | 4/38 | Pierce | 188—73 |
| 2,820,530 | 1/58 | Chouings et al. | 188—73 |
| 2,855,074 | 10/58 | Casey | 188—73 |
| 3,129,789 | 4/64 | Hodkinson | 188—72 |

ARTHUR L. LA POINT, *Primary Examiner.*

EUGENE G. BOTZ, *Examiner.*